US011003790B2

(12) United States Patent
Pridgen

(10) Patent No.: US 11,003,790 B2
(45) Date of Patent: May 11, 2021

(54) PREVENTING DATA LEAKAGE VIA VERSION CONTROL SYSTEMS

(71) Applicant: Cisco Technology, Inc., San Jose, CA (US)

(72) Inventor: Adam Thomas Pridgen, Montgomery, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 200 days.

(21) Appl. No.: 16/199,436

(22) Filed: Nov. 26, 2018

(65) Prior Publication Data

US 2020/0167498 A1    May 28, 2020

(51) Int. Cl.
*G06F 21/62* (2013.01)
*H04L 29/06* (2006.01)
*G06N 20/00* (2019.01)

(52) U.S. Cl.
CPC ......... *G06F 21/6245* (2013.01); *G06N 20/00* (2019.01); *H04L 63/02* (2013.01)

(58) Field of Classification Search
CPC ... G06F 21/6245; G06F 21/556; G06N 20/00; H04L 63/02; H04L 63/0227
See application file for complete search history.

(56) References Cited

U.S. PATENT DOCUMENTS

| 8,973,088 | B1 * | 3/2015 | Leung | H04L 63/20 726/1 |
|---|---|---|---|---|
| 9,152,789 | B2 | 10/2015 | Natarajan et al. | |
| 9,336,388 | B2 * | 5/2016 | Brdiczka | G06F 21/552 |
| 9,374,374 | B2 * | 6/2016 | Steinberg | G06Q 50/01 |
| 9,998,470 | B1 * | 6/2018 | Hockings | H04L 67/306 |
| 10,063,654 | B2 * | 8/2018 | Kirti | H04L 67/306 |
| 10,657,459 | B2 * | 5/2020 | Hack | G06F 16/219 |
| 2008/0059474 | A1 * | 3/2008 | Lim | G06F 16/93 |
| 2008/0262990 | A1 * | 10/2008 | Kapoor | H04L 63/1408 706/20 |
| 2012/0084868 | A1 * | 4/2012 | Julisch | G06F 21/6218 726/26 |

(Continued)

OTHER PUBLICATIONS

B. Anderson, et al., "Limitless HTTP in an HTTPS World: Inferring the Semantics of the HTTPS Protocol without Decryption", arXiv:1805.11544v1 [cs.CR], May 29, 2018, 15 pages.

(Continued)

*Primary Examiner* — Tongoc Tran
(74) *Attorney, Agent, or Firm* — Edell, Shapiro & Finnan, LLC

(57) ABSTRACT

A computer system prevents data leakage via version control systems. Outgoing traffic that is destined for an external server hosting a version control system is identified. The outgoing traffic is associated with an endpoint device corresponding to an individual who is a member of the organization. Historical information is collected about the individual, and a user account of the version control system that is associated with the identified individual is identified. The external server hosting the version control system is searched to determine whether potentially sensitive information has been uploaded. Embodiments may further include a method and program product for preventing data leakage via version control systems in substantially the same manner described above.

20 Claims, 4 Drawing Sheets

(56) References Cited

U.S. PATENT DOCUMENTS

| | | | |
|---|---|---|---|
| 2013/0227714 A1* | 8/2013 | Gula | G06F 21/64 726/32 |
| 2014/0165137 A1* | 6/2014 | Balinsky | G06F 21/554 726/1 |
| 2015/0227611 A1* | 8/2015 | Bao | G06F 17/11 707/737 |
| 2015/0317721 A1* | 11/2015 | T J | G06Q 10/047 715/835 |
| 2016/0162522 A1 | 6/2016 | Ganatra | |
| 2017/0374016 A1 | 12/2017 | Reddy et al. | |
| 2018/0027006 A1 | 1/2018 | Zimmerman et al. | |
| 2018/0097835 A1 | 4/2018 | McGrew et al. | |
| 2018/0103056 A1 | 4/2018 | Kohout et al. | |
| 2018/0139141 A1 | 5/2018 | Stepanek et al. | |
| 2018/0152467 A1 | 5/2018 | Anderson et al. | |
| 2018/0158322 A1* | 6/2018 | McDonnell | H04W 4/025 |
| 2018/0189677 A1 | 7/2018 | Andreson et al. | |
| 2018/0191748 A1 | 7/2018 | McGrew et al. | |
| 2018/0232534 A1* | 8/2018 | Dotan-Cohen | H04W 12/0013 |
| 2019/0163459 A1* | 5/2019 | Sreenivasa | G06F 8/71 |

OTHER PUBLICATIONS

D. McGrew, et al., "Enhanced Telemetry for Encrypted Threat Analytics", 2016 IEEE 24th International Conference on Network Protocols (ICNP) Workshop on Machine Learning in Computer Networks (NetworkML 2016), Nov. 8-11, 2016, Singapore, 6 pages.

B. Anderson, et al., "Identifying Encrypted Malware Traffic with Contextual Flow Data", AISec'16, Oct. 28, 2018, Vienna, Austria, 12 pages.

\* cited by examiner

PREVENTING DATA LEAKAGE VIA VERSION CONTROL SYSTEMS

TECHNICAL FIELD

The present disclosure relates to identifying and preventing data leakage via version control systems.

BACKGROUND

Document version control refers to the manner in which different versions or drafts of documents are managed. A version control service is a service that enables collaboration between developers on a project. When a developer uploads data, such as a commit of code, to a public version control service, other members of the public may view the data. One challenge that organizations face is identifying and preventing the leakage of sensitive data to version control services.

DESCRIPTION OF EXAMPLE EMBODIMENTS

Overview

The present disclosure relates to preventing data leakage, and more specifically, to identifying and preventing data leakage via a version control system. A member of an organization may upload sensitive data to public services without organizational approval, thereby leaking intellectual property or other otherwise sensitive, secret or confidential information, to unauthorized individuals. Conventional approaches to identifying organizational members who are responsible for data leakage require significant manual investigation, and are often hindered by the fact that a user may upload sensitive data to a version control system via an encrypted tunnel, which prevents direct inspection. The embodiments presented herein identify and prevent data leakage by monitoring an internal network for outgoing traffic to a version control system, determining whether data leakage has occurred, and if so, identifying the party responsible. In particular, outgoing traffic that is destined for an external server hosting a version control system is identified. The outgoing traffic is associated with an endpoint device corresponding to an individual who is a member of the organization. Historical information is collected about the individual, and a user account of the version control system that is associated with the identified individual is identified. The external server hosting the version control system is searched to determine whether potentially sensitive information has been uploaded to the version control system, and if so, remedial actions may be taken.

Example Embodiments

Figure 1:
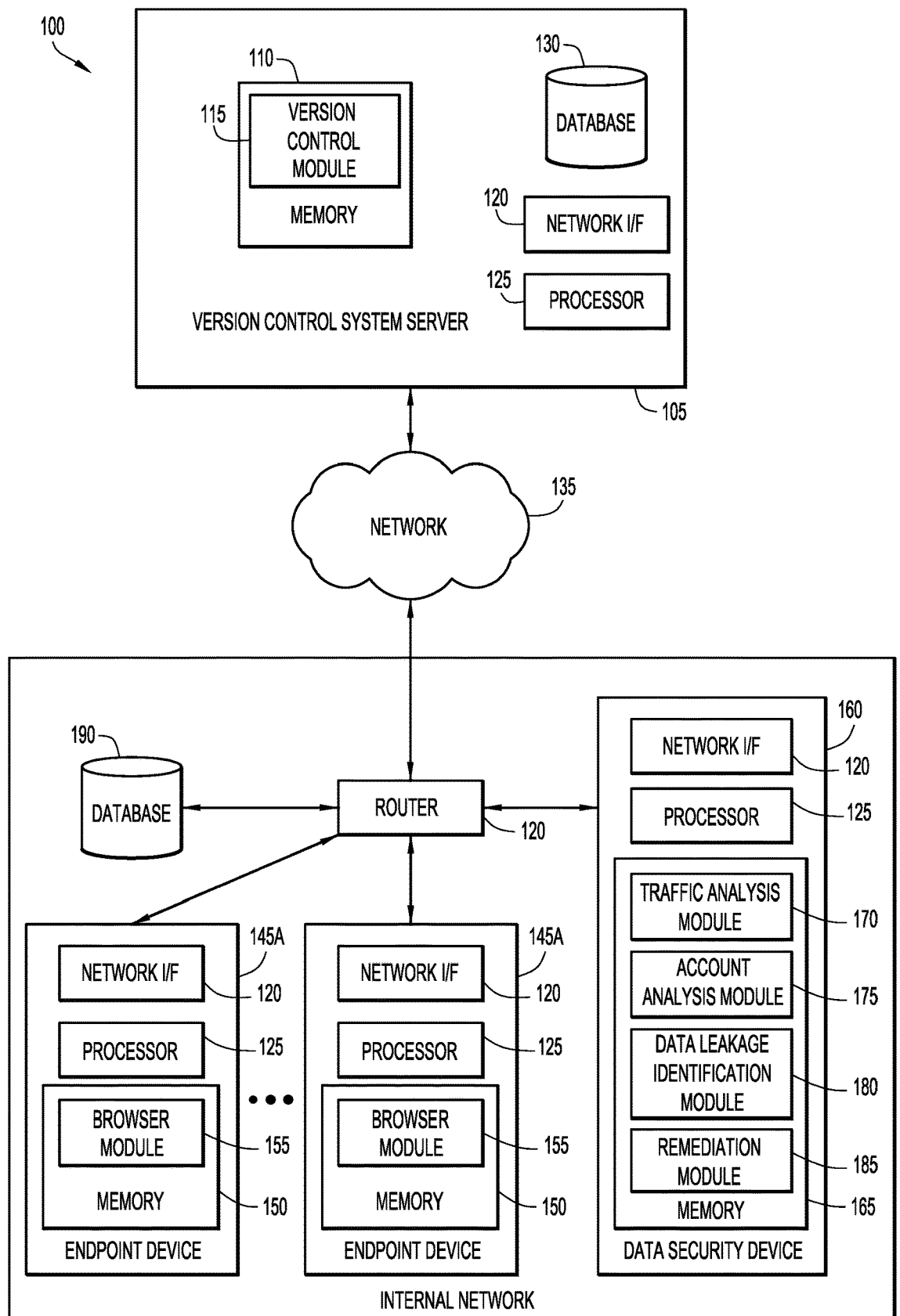
FIG. 1 is block diagram depicting a computing environment for detecting data leakage, in accordance with an example embodiment.

Embodiments are now described in detail with reference to the figures. FIG. 1 is a block diagram depicting a computing environment 100 for detecting data leakage. As depicted, computing environment 100 includes a version control system server 105, a communication network 135, and an internal network 140, such as an enterprise network. It is to be understood that the functional division among components of computing environment 100 have been chosen for purposes of explaining the embodiments and is not to be construed as a limiting example.

Version control system server 105 includes memory 110, a network interface 120, at least one processor 125, and database 130. Memory 110 stores software instructions for a version control module or function 115. Network interface 120 may include one or more network interface cards that enable the version control system server 105 to send and receive data over a network, such as network 135. In some example embodiments, version control system server 105 is a web-based public version control system, such as GitHub® or Bitbucket®. Version control system server 105 may include internal and external hardware components, as depicted and described in further detail with respect to FIG. 4.

Version control module 115 may include one or more modules or units to perform various functions of the embodiments described below. Version control module 115 may be implemented by any combination of any quantity of software (and/or hardware modules or units), and may reside within memory 110 of version control system server 105 for execution by a processor, such as processor 125.

Version control module 115 may host one or more version control services. In some embodiments, version control module 115 provides a web-based distributed version control and source code management service in which users can collaborate to develop code. For example, users may propose tentative changes to a document, commit changes to a document, add or delete documents or portions of documents, or otherwise modify documents. Version control module 115 may provide a version control mechanism that tracks the history of changes made to any documents. The documents that are developed using a version control system of version control module 115 may include source code for computer programs. Version control module 115 may authenticate user accounts in order to enable users to participate in a version control service. In some embodiments, version control module 115 provides a distributed version control service. Some or all of the information uploaded to a version control service of version control module 115 may be publicly-available over a network, such as the Internet. Version control module 115 may organize documents on a project level, so that users may simultaneously maintain separate projects.

Database 130 may include any non-volatile storage media known in the art. For example, database 130 can be implemented with a tape library, optical library, one or more independent hard disk drives, or multiple hard disk drives in a redundant array of independent disks (RAID). Similarly, data on database 130 may conform to any suitable storage architecture known in the art, such as a file, a relational database, an object-oriented database, and/or one or more tables. Database 130 may store data corresponding to version control systems, including any documents, source code, proposed modifications, project history data, and any corresponding metadata. Database 130 may also store information relating to user accounts, such as a user account history detailing user account activity, including any modifications made to documents, any data that is uploaded by a user account, any data that is downloaded by a user account, and the like.

Network 135 may include a local area network (LAN), a wide area network (WAN) such as the Internet, or a combination thereof, and includes wired, wireless, or fiber optic connections. In general, network 135 can use any combination of connections and protocols that support communications between version control system server 105 and devices of internal network 150 via network interfaces.

Internal network 140 includes any private network associated with an organization/enterprise, such as an intranet. Internal network 140 may enable multiple endpoint devices to access external networks, such as other intranets or the Internet. Internal network 140 includes one or more endpoint devices 145A-145N, a data security device 160, and a database 190. Internal network 140 also includes at least one router 142 to forward data packets between devices of internal network 140 and devices of external networks, such as version control system server 105. FIG. 1 shows a simplified depiction of an internal/enterprise network and it should be understood that there are numerous other components in such a network, but for simplicity those components are not shown in FIG. 1.

Each endpoint device 145A-145N includes a network interface 120, processor 125, and memory 150, which stores software instructions for browser module 155. In various embodiments, each endpoint device may include a server, laptop computer, a tablet computer, a netbook computer, a personal computer (PC), a desktop computer, a personal digital assistant (PDA), a smart phone, a thin client, or any programmable electronic device capable of executing computer readable program instructions. Each endpoint device 145A-145N may include internal and external hardware components, as depicted and described in further detail with respect to FIG. 4.

Browser module 155 may include one or more modules or units to perform various functions of the embodiments described below. Browser module 115 may be implemented by any combination of any quantity of software (and/or hardware modules or units), and may reside within memory 150 of an endpoint device for execution by a processor, such as processor 125. Browser module 155 may include any application for retrieving, presenting, and traversing documents that are accessible over a network, such as an intranet or the World Wide Web. A user of an endpoint device 145 may use browser module 155 to access data on a server, such as version control system server 105. Furthermore, browser module 155 may enable a member of an organization to transfer data, including potentially sensitive data, from internal network 140 to an external server, such as version control system server 105. In some embodiments, browser module 155 includes include any conventional or other web browser software.

Data security device 160 includes a network interface 120, a processor 125, and memory 165, which stores software instructions for traffic analysis module 170, account analysis module 175, data leakage identification module 180, and remediation module 185. Network interface 120 enables components of data security device 160 to send and receive data over a network, such as internal network 140 and network 135. Data security device 160 may include internal and external hardware components, as depicted and described in further detail with respect to FIG. 4.

Data security device 160 and its modules may include a packet analyzer that inspects traffic passing through router 142 of internal network 140 in order to identify and prevent unauthorized data leakage. In some embodiments, data security device 160 and/or any modules of data security device 160 may be included as components of router 142. Alternatively, the functions of the data security device 160 may be performed by an endpoint device or a server that inspects data packets provided by router 142.

Traffic analysis module 170 may analyze any traffic passing through router 142 of internal network 140. In particular, traffic analysis module 170 may analyze any data transferred between endpoint devices 145A-145N and external servers, such as version control system server 105. Traffic analysis module 170 may identify any traffic from endpoint devices 145A-145N that is destined for an external server, such as version control system server 105. To identify traffic that is outbound to version control system server 105, traffic analysis module 170 may utilize contextual information, such as domain name system (DNS) look-ups and responses to DNS look-ups. Traffic analysis module 170 may also associate particular IP addresses with version control system server 105, and identify any traffic originating from an endpoint device and destined for the IP address. In some embodiments, traffic analysis module 170 analyzes encrypted traffic using ports that are associated with common version control system communication channels, such as port 22 or port 443.

When traffic analysis module 170 identifies traffic between an endpoint device, such as endpoint device 145A, and version control system server 105, traffic analysis module 170 may determine whether the traffic should receive further scrutiny. Since traffic may be encrypted, traffic analysis module 170 identify traffic indicative of an endpoint device potentially leaking sensitive data based on the volume of data that the endpoint device is uploading to an external server. For example, traffic analysis module 170 may identify any endpoint device 145 that is sending an amount of data to version control system server 105 that is much greater than the amount of data version control system server 105 is sending to the endpoint device. Traffic analysis module 170 may thus identify any endpoint devices that are likely engaged in git push operations rather than git pull operations.

Account analysis module 175 may analyze the activity of any endpoint device identified by traffic analysis module 170 in order to identify a user account and the identity of a user that is associated with the endpoint device. Account analysis module 175 may evaluate an internal database to enumerate any individuals associated with an identified endpoint device 145. For example, database 190 may contain a registry linking endpoint devices 145A-145N to user accounts and/or identities of individuals to whom the endpoint devices 145A-145N are registered. Each endpoint device 145 may be linked to one or more user accounts and/or identities of individuals based on an identifier of the endpoint device, such as a hostname, serial number, IP address, workstation ID, etc. Account analysis module 175 may scan an identified endpoint device 145 in order to determine whether the endpoint device has any software installed that is associated with version control.

Account analysis module 175 may also search any logs that contain historical information regarding the identified endpoint device and/or the user account associated with the device. For example, account analysis module 175 may search web browsing history logs to learn which websites the user of an endpoint device has visited. Similarly, account analysis module 175 may scan emails associated with the identified user account to determine whether any emails contain content relating to an external version control system. Using this information, along with the real name of the user, the user's geographic location, and the user's email addresses, account analysis module 175 may search a version control system website and/or any third-party websites to determine whether the user is active on those websites.

Data leakage identification module 180 may scan external locations that are associated with a user who is potentially leaking data. Data leakage identification module 180 may scan version control system server 105 and any third-party websites with which an identified user is associated. Data leakage identification module 180 may identify potential data leakage by comparing data found on external locations to data that an organization considers to be sensitive or confidential. Data leakage identification module 180 may search external locations using regular expressions or key terms to search for potentially sensitive information. In some embodiments, data leakage identification module 180 performs static source code analysis to search for potential matches for internal source code related to products. Data leakage identification module 180 may utilize conventional or other machine-learning algorithms to perform analysis on non-source code documents.

Remediation module 185 may perform one or more actions in response to detection of data leakage. Remediation module 185 may notify one or more designated individuals in an organization when data leakage is identified. For example, remediation module 185 may send a notification (e.g., email, text message, etc.) to an endpoint device associated with a designated individual, such as an administrator, a manager, a chief technology officer or chief information officer, and the like. In some embodiments, remediation module 185 may send a party who is responsible for hosting the leaked data a request to remove the data. For example, some websites may provide mechanisms to initiate a removal of content that was uploaded by an unauthorized party.

Database 190 may include any non-volatile storage media known in the art. For example, database 190 can be implemented with a tape library, optical library, one or more independent hard disk drives, or multiple hard disk drives in a redundant array of independent disks (RAID). Similarly, data on database 190 may conform to any suitable storage architecture known in the art, such as a file, a relational database, an object-oriented database, and/or one or more tables. Database 190 may store data relating to individuals of an organization, user accounts and endpoint devices associated with the individuals, as well as any data corresponding to potentially sensitive information, such as source code data, trade secret data, API tokens, keys, and password, personally identifiable information, and any other confidential or sensitive data.

Figure 2:
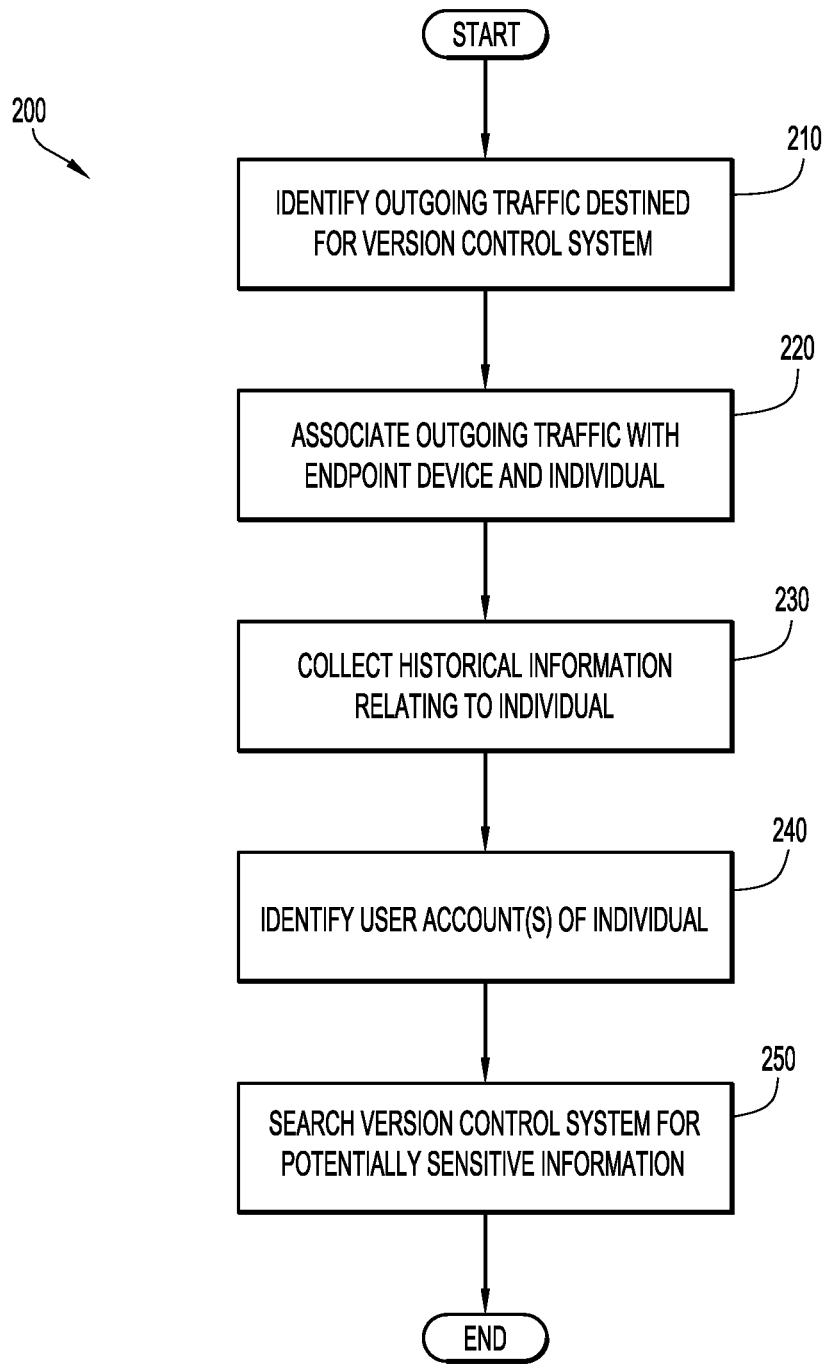
FIG. 2 is a flow chart depicting a method of identifying a user potentially responsible for leaking data, in accordance with an example embodiment.

FIG. 2 is a flow chart depicting a method 200 of identifying a user potentially responsible for leaking data, in accordance with an example embodiment. Reference is also made to FIG. 1 for purposes of the description of FIG. 2. In one form, the processor 125 of the data security device 160 performs the operations of method 200 by executing instructions for the traffic analysis module 170, the account analysis module 180 and the data leakage identification module 180.

Outgoing traffic that is destined for a version control system is identified at operation 210. Traffic analysis module 170 may identify any traffic originating from an endpoint device, such as endpoint device 145A, that is destined for an external version control system server, such as version control system server 105. Traffic analysis module 170 may identify traffic by analyzing packets passing through router 142 to detect any packets destined for version control system server 105. Traffic analysis module 170 may, for example, identify domain name system (DNS) requests to resolve an IP address associated with version control system server 105, as well as responses to DNS requests. Encrypted traffic, such as Hyper Text Transfer Protocol Secure (HTTPS) or Secure Shell (SSH) traffic, or traffic using ports 22 or 443, may be analyzed to determine whether any of the traffic is outbound for version control system server 105. Traffic may be classified as legitimate if the traffic is mostly associated with download (e.g., git pull) operations, rather than upload (e.g., git push) operations, which can be determined based on the ratio of downloaded data to uploaded data. In some embodiments, conventional or other machine learning techniques may be utilized to identify any encrypted or unencrypted outgoing traffic that is associated with an update to content that is under version control in a version control system.

The outgoing traffic is associated with an endpoint device and an individual at operation 220. Account analysis module 170 may initially consult a database, such as database 190, to identify the identity (e.g., real name) and user account of the individual associated with an endpoint device identified for inspection. Account analysis module 170 may also access the endpoint device, or may request logs from the endpoint device, in order to identify any relevant software used for version control that may be installed on the endpoint device. For example, account analysis module 175 may scan an endpoint device using IT management or security software to identify any software related to distributed version control systems, any directory structures related to version control systems, any configuration files containing credentials for version control systems, and any other evidence that the user of the identified endpoint device was accessing an external version control system. In some embodiments, account analysis module 175 may search deleted files or data remanence resulting from file deletion for evidence of version control system usage. Account analysis module 175 may also search backups of the endpoint device and virtual machine disks associated with the endpoint device.

Historical information relating to the individual is collected at operation 230. Account analysis module 175 may search logs, such as proxy web logs, and emails relating to a user account of the individual identified for investigation. By analyzing a user's web browsing history, account analysis module 175 can determine which websites the user has visited in the past. Other information about the individual can be collected by analyzing logs that indicate one or more external user accounts (e.g., user accounts not associated with internal network 140 or its organization) that the individual might have registered with a version control system.

One or more user accounts of the individual are identified at operation 240. Account analysis module 175 may analyze all of the collected information about an individual in order to learn more about the individual. For example, artifacts in logs might contain authentication parameters, parameters in Uniform Resource Locators (URLs), or HTTP POST commands that reveal information about the individual's usage of a version control system. Account analysis module 175 may identify any non-organizational email accounts associated with the individual being investigated. For example, account analysis module 175 may learn of any personal email accounts, and may look for any emails that are associated with version control system domains. For example, the individual may have sent an email to, or received an email from, an address associated with a particular version control system. Account analysis module 175 may also identify other details about the individual, such as the user's real name and geographic location. Account analysis module 175 may query third-party websites via Application Programming Interfaces (APIs) using the discovered information to identify additional email aliases, usernames, and other search criteria associated with the individual.

Once account analysis module 175 has identified email accounts and usernames associated with the individual, account analysis module 175 may connect the individual with an external service account name that is associated with a version control system. For example, potential user accounts may be enumerated based on artifacts learned by account analysis module 175. The user accounts associated with an individual may be used to search version control systems and other third-party websites to find other repositories and projects to which the user is participating.

A version control system is searched for potentially sensitive information at operation 250. Any content that has been committed by an account associated with the user may be scanned by data leakage identification module 180 in order to determine whether the committed content contains potentially sensitive information. The version control system and other public source code repositories may be searched periodically in order to detect potential future data leakage.

Figure 3:
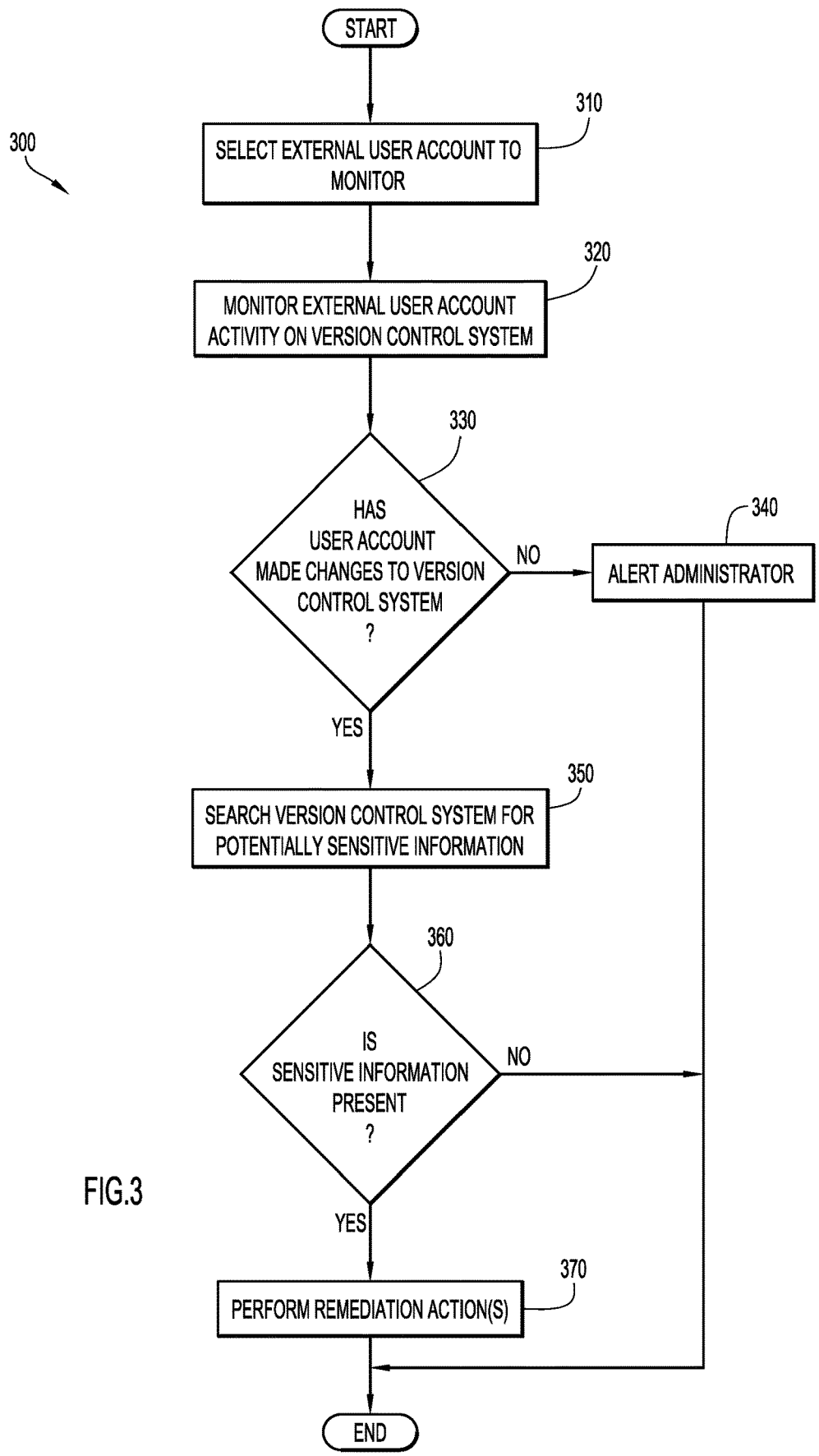
FIG. 3 is a flow chart depicting a method of identifying data leakage, in accordance with an example embodiment.

FIG. 3 is a flow chart depicting a method 300 of identifying data leakage in accordance with an example embodiment. Reference is also made to FIG. 1 for purposes of the description of FIG. 3. The processor 125 of data security device 150 may perform the operations of method 300 by executing the instructions for the data leakage identification module 180 and the instructions for the remediation module 185.

An external user account is selected for monitoring at operation 310. Data leakage identification module 180 may select one or more user accounts registered with a version control system and associated with an individual under investigation. The user account's activity on a version control system is monitored at operation 320. The user account may be monitored in order to detect when the user account commits content to the version control system. Data leakage identification module 180 may schedule periodic scans of a version control system, such as version control system server 105, in order to detect when an individual's user account commits content.

Operation 330 determines whether the user account has made changes to content in a version control system. If the user account does not make any changes to content in a version control system, then an administrator may be alerted at operation 340. The administrator may then determine whether the individual may have another account being used to commit changes to a project in a version control system. If the user account has made changes to content in a version control system, then the system is searched for potentially sensitive information at operation 350. Data leakage identification module 180 may search the external locations once, or may schedule periodic searches, in order to detect whether potentially sensitive information has been uploaded. In some embodiments, data leakage identification module 180 searches every external location, including version control systems and other third-party websites that are associated with user accounts of the individual. Data leakage identification module 180 may use regular expressions and/or keywords to search for known sensitive information. In some embodiments, data leakage identification module 180 performs a static source code analysis to search for potential matches to an organization's internal source code. Furthermore, data leakage identification module 180 may utilize conventional or other machine learning techniques, such as natural language processing, in order to detect the presence of potentially sensitive information in non-source code documents.

Operation 360 determines whether potentially sensitive information is present. If data leakage identification module 180 has detected the presence of potentially sensitive information, one or more remediation actions are performed at operation 370. For example, remediation module 185 may notify one or more designated individuals in an organization whenever data leakage is identified. Remediation module 185 may send a notification to an endpoint device associated with a designated individual, such as an administrator, a manager, a chief technology officer or chief information officer, and the like. Additionally or alternatively, remediation module 185 may send to a party who is responsible for hosting the leaked data a request to remove the data. For example, some websites may provide mechanisms to initiate a removal of content that was uploaded by an unauthorized party. If there is no sensitive information that is present (No branch of operation 360), then method 300 may terminate without performing remediation actions.

Figure 4:
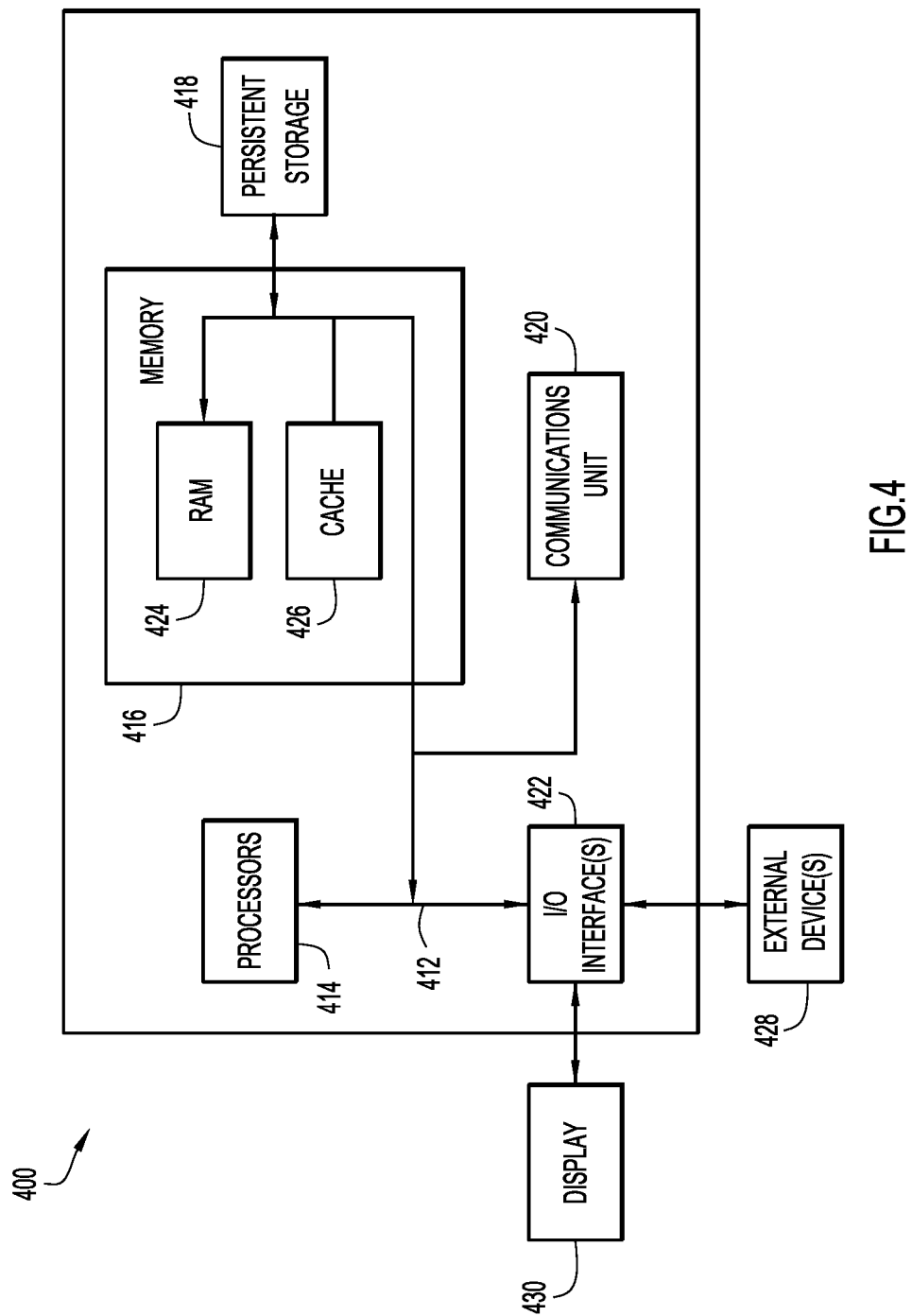
FIG. 4 is a block diagram depicting a computing device configured to perform the methods presented herein, in accordance with an example embodiment.

FIG. 4 is a block diagram depicting components of a computer 400 suitable for executing the methods disclosed herein. Computer 400 may implement version control system server 105, endpoint devices 145A-145N, and/or data security device 160 in accordance with embodiments presented herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 412, which provides communications between computer processor(s) 414, memory 416, persistent storage 418, communications unit 420, and input/output (I/O) interface(s) 422. Communications fabric 412 can be implemented with any architecture designed for passing data and/or control information between processors (such as microprocessors, communications and network processors, etc.), system memory, peripheral devices, and any other hardware components within a system. For example, communications fabric 412 can be implemented with one or more buses.

Memory 416 and persistent storage 418 are computer readable storage media. In the depicted embodiment, memory 416 includes random access memory (RAM) 424 and cache memory 426. In general, memory 416 can include any suitable volatile or non-volatile computer readable storage media.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to computer 400. For example, I/O interface 422 may provide a connection to external devices 428 such as a keyboard, keypad, a touch screen, and/or some other suitable input device. External devices 428 can also include portable computer readable storage media such as, for example, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to leakage detection (e.g., user account data, collected data relating an individual, data relating to sensitive information, etc.) may be stored within any conventional or other data structures (e.g., files, arrays, lists, stacks, queues, records, etc.) and may be stored in any desired storage unit (e.g., database, data or other repositories, queue, etc.). The data transmitted between version control system server 105, endpoint devices 145A-145N, and/or data security device 160 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to leakage detection (e.g., user account data, collected data relating an individual, data relating to sensitive information, etc.) may include any information provided to, or generated by, version control system server 105, endpoint devices 145A-145N, and data security device 160. Data relating to leakage detection may include any desired format and arrangement, and may include any quantity of any types of fields of any size to store any desired data. The data relating to leakage detection may include any data collected about entities by any collection means, any combination of collected information, and any information derived from analyzing collected information.

The present embodiments may employ any number of any type of user interface (e.g., Graphical User Interface (GUI), command-line, prompt, etc.) for obtaining or providing information (e.g., data relating to leakage detection), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of preventing data leakage via version control systems.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., version control module 115, browser module 155, traffic analysis module 170, account analysis module 175, data leakage identification module 180, remediation module 185, etc.). These systems may include any types of monitors and input devices (e.g., keyboard, mouse, voice recognition, etc.) to enter and/or view information.

It is to be understood that the software (e.g., version control module 115, browser module 155, traffic analysis module 170, account analysis module 175, data leakage identification module 180, remediation module 185, etc.) of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments (e.g., version control module 115, browser module 155, traffic analysis module 170, account analysis module 175, data leakage identification module 180, remediation module 185, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to leakage detection). The database system may be implemented by any number of any conventional or other databases, data stores or storage structures (e.g., files, databases, data structures, data or other repositories, etc.) to store information (e.g., data relating to leakage detection). The database system may be included within or coupled to the server and/or client systems. The database systems and/or storage structures may be remote from or local to the computer or other processing systems, and may store any desired data (e.g., data relating to leakage detection).

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the present embodiments in the form disclosed. Many modifications and variations will be apparent to those of ordinary skill in the art without departing from the scope and spirit of the presented embodiments. The embodiment was chosen and described in order to best explain the principles of the presented embodiments and the practical application, and to enable others of ordinary skill in the art to understand various embodiments with various modifications as are suited to the particular use contemplated.

The descriptions of the various embodiments of the present embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of the presented embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a computer-implemented method is provided comprising: identifying outgoing traffic destined for an external server hosting a version control system; associating the outgoing traffic with an endpoint device corresponding to an individual; collecting historical information relating to the individual; identifying a user account for the external server that is associated with the individual; and detecting whether potentially sensitive information has been uploaded to the version control system via the user account by searching the external server for content provided by the user account.

In one form, the method may further include scanning/searching one or more public databases for the potentially sensitive information. In another form, the method may further include utilizing machine learning to identify potentially sensitive information in source code documents and non-source code documents based on the scanning of the one or more public databases. In still another form, the method may further include analyzing one or more third-party websites to identify other accounts associated with the individual using one or more of a name of the individual, an email address of the individual, and a geographic location of the individual; wherein scanning the one or more public databases comprises using identified other accounts to locate the potentially sensitive information.

The operation of associating outgoing traffic with the endpoint device may include evaluating data in an internal database of an enterprise to determine an identity of the individual.

The collecting operation may include collecting the historical information relating to the individual from one or more of web logs, emails, and third-party websites.

The detecting operation may include scheduling periodic scans of content committed by the identified user account to the version control system.

The identifying operation may include utilizing machine learning techniques to identify outgoing traffic that comprises an update to content in the version control system.

The method may further include performing one or more remedial actions, wherein the one or more remedial actions include notifying a designated user account of an organization, and sending a notification to the external server hosting the version control system.

In another form, a computer system is provided comprising: a communication interface configured to enable network communications; one or more computer processors; one or more computer readable storage media; program instructions stored on the one or more computer readable storage media for execution by at least one of the one or more computer processors, the program instructions comprising instructions to: identify outgoing traffic destined for an external server hosting a version control system; associate the outgoing traffic with an endpoint device corresponding to an individual; collect historical information relating to the individual; identify a user account for the external server that is associated with the individual; and detect whether potentially sensitive information has been uploaded to the version control system via the user account by searching the external server for content provided by the user account.

In still another form, one or more non-transitory computer readable storage media are provided, encoded with instructions that, when executed by a processor, cause the processor to: identify outgoing traffic destined for an external server hosting a version control system; associate the outgoing traffic with an endpoint device corresponding to an individual; collect historical information relating to the individual; identify a user account for the external server that is associated with the individual; and detect whether potentially sensitive information has been uploaded to the version control system via the user account by searching the external server for content provided by the user account.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying outgoing traffic destined for a third party server outside an enterprise network hosting a version control system;
associating the outgoing traffic with an endpoint device corresponding to an individual;
collecting historical information relating to the individual;
identifying a user account for the version control system hosted by the third party server outside the enterprise network that is associated with the individual by:
analyzing the historical information to identify one or more user accounts associated with the individual, and
searching the version control system using the one or more user accounts associated with the individual to identify the user account of the individual for the version control system; and
detecting whether potentially sensitive information has been uploaded to the version control system via the user account by searching the third party server outside the enterprise network for content provided by the user account.

2. The method of claim 1, further comprising scanning one or more public databases for the potentially sensitive information.

3. The method of claim 2, further comprising utilizing machine learning to identify potentially sensitive information in source code documents and non-source code documents based on the scanning of the one or more public databases.

4. The method of claim 3, further comprising:
analyzing one or more third-party websites to identify other accounts associated with the individual using one or more of a name of the individual, an email address of the individual, and a geographic location of the individual;
wherein scanning the one or more public databases comprises using identified other accounts to locate the potentially sensitive information.

5. The method of claim 1, wherein associating the outgoing traffic with the endpoint device comprises evaluating data in an internal database of the enterprise network to determine an identity of the individual.

6. The method of claim 1, wherein collecting includes collecting the historical information relating to the individual from one or more of web logs, emails, and third-party web sites.

7. The method of claim 1, wherein detecting includes scheduling periodic scans of content committed by the identified user account to the version control system.

8. The method of claim 1, further comprising performing one or more remedial actions, wherein the one or more remedial actions include notifying a designated user account of an organization, and sending a notification to the third party server outside the enterprise network hosting the version control system.

9. The method of claim 1, wherein identifying outgoing traffic further comprises utilizing machine learning to identify outgoing traffic that comprises an update to content in the version control system.

10. A computer system comprising:
a communication interface configured to enable network communications;
one or more computer processors;
one or more computer readable storage media;
program instructions stored on the one or more computer readable storage media for execution by at least one of the one or more computer processors, the program instructions comprising instructions to:
identify outgoing traffic destined for a third party server outside an enterprise network hosting a version control system;
associate the outgoing traffic with an endpoint device corresponding to an individual;
collect historical information relating to the individual;
identify a user account for the version control system hosted by the third party server outside the enterprise network that is associated with the individual by:
analyzing the historical information to identify one or more user accounts associated with the individual, and
searching the version control system using the one or more user accounts associated with the individual to identify the user account of the individual for the version control system; and
detect whether potentially sensitive information has been uploaded to the version control system via the user account by searching the third party server outside the enterprise network for content provided by the user account.

11. The computer system of claim 10, further comprising instructions to scan one or more public databases for the potentially sensitive information.

12. The computer system of claim 11, further comprising instructions to utilize machine learning to identify potentially sensitive information in non-source code documents based on scanning of the one or more public databases.

13. The computer system of claim 12, further comprising instructions to:
analyze one or more third-party websites to identify other accounts associated with the individual using one or more of a name of the individual, an email address of the individual, and a geographic location of the individual; and
wherein the instructions to scan include instructions to scan the one or more public databases using identified other accounts to locate the potentially sensitive information.

14. The computer system of claim 10, wherein the instructions to associate the outgoing traffic with the endpoint device comprise instructions to evaluate data in the internal database of the enterprise network to determine an identity of the individual.

15. The computer system of claim 10, wherein the instructions to collect include instructions to collect the historical information relating to the individual from one or more of web logs, emails, and third-party websites.

16. The computer system of claim 10, wherein the instructions to detect include instructions to schedule periodic scans of content committed by the identified user account to the version control system.

17. One or more non-transitory computer readable storage media encoded with instructions that, when executed by a processor, cause the processor to:
identify outgoing traffic destined for a third party server outside an enterprise network hosting a version control system;
associate the outgoing traffic with an endpoint device corresponding to an individual;
collect historical information relating to the individual;

identify a user account for the version control system hosted by the third party server outside the enterprise network that is associated with the individual by:
- analyzing the historical information to identify one or more user accounts associated with the individual, and
- searching the version control system using the one or more user accounts associated with the individual to identify the user account of the individual for the version control system; and detect whether potentially sensitive information has been uploaded to the version control system via the user account by searching the third party server outside the enterprise network for content provided by the user account.

18. The one or more non-transitory computer readable storage media of claim 17, further comprising instructions to scan one or more public databases for the potentially sensitive information.

19. The one or more non-transitory computer readable storage media of claim 18, further comprising instructions to utilize machine learning to identify potentially sensitive information in non-source code documents based on scanning of the one or more public databases.

20. The one or more non-transitory computer readable storage media of claim 19, further comprising instructions to:
- analyze one or more third-party websites to identify other accounts associated with the individual using one or more of a name of the individual, an email address of the individual, and a geographic location of the individual; and
- wherein the instructions to scan the one or more public databases for the potentially sensitive information include instructions to use identified other accounts to locate the potentially sensitive information.

* * * * *